United States Patent [19]

Pacifici

[11] Patent Number: 5,446,195
[45] Date of Patent: Aug. 29, 1995

[54] WATER-SOLUBLE ACTIVE METHYLENES AS FORMALDEHYDE SCAVENGERS

[75] Inventor: Joseph A. Pacifici, La Grange, Ga.

[73] Assignee: West Point Pepperell, West Point, Ga.

[21] Appl. No.: 981,581

[22] Filed: Nov. 25, 1992

Related U.S. Application Data

[60] Division of Ser. No. 713,546, Jun. 7, 1991, Pat. No. 5,194,674, which is a continuation-in-part of Ser. No. 53,606, May 20, 1987, abandoned, Ser. No. 52,842, May 20, 1987, abandoned, Ser. No. 71,032, Jul. 8, 1987, abandoned, and Ser. No. 186,304, May 9, 1988, which is a continuation of Ser. No. 71,033, Jul. 8, 1987, abandoned, which is a continuation-in-part of Ser. No. 902,750, Sep. 2, 1986, abandoned, said Ser. No. 53,606, is a continuation of Ser. No. 902,750, Sep. 2, 1986, said Ser. No. 523,842, is a division of Ser. No. 902,750, Sep. 2, 1986, said Ser. No. 71,032, is a continuation-in-part of Ser. No. 902,750, Sep. 2, 1986 abandoned.

[51] Int. Cl.$^6$ .............................................. C07C 69/72
[52] U.S. Cl. .................................... 560/178; 568/386; 568/606
[58] Field of Search ................. 568/386, 606; 560/178

[56] References Cited

U.S. PATENT DOCUMENTS 3,374,246  3/1968  Marcus et al. ...................... 568/386

FOREIGN PATENT DOCUMENTS 027182  8/1971  Japan .

OTHER PUBLICATIONS

CAS Search Report.

*Primary Examiner*—José G. Dees
*Assistant Examiner*—Joseph M. Conrad, III
*Attorney, Agent, or Firm*—Pennie & Edmonds

[57] ABSTRACT

A formaldehyde scavenger composition consisting of a water-soluble compound of the formula, wherein

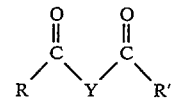

—R and R' are the identical or different and are methyl or

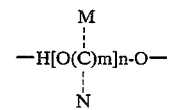

where m=1–3 and n=1–19, —Y is CH2 or —CH2—CO—CH2 and M and N are hydrogen or lower alkyl.

9 Claims, 2 Drawing Sheets

WATER-SOLUBLE ACTIVE METHYLENES AS FORMALDEHYDE SCAVENGERS

CROSS-REFERENCE TO RELATED APPLICATIONS

This is a division of application Ser. No. 07/713,546, filed Jun. 7, 1991 now U.S. Pat. No. 5,194,674, which is a continuation-in-part of each of application Ser. Nos. 53,606 filed May 20, 1987, now abandoned 52,842 filed May 20, 1987 now abandoned and 71,032 filed Jul. 8, 1987 now abandoned which are respectively a continuation, division and continuation-in-part of application Ser. No. 902,750 filed Sep. 2, 1986 now abandoned. This is also a continuation in part of application Ser. No. 07/186,304 filed May 9, 1988 which is a continuation of application Ser. No. 71,033 filed Jul. 8, 1987 now abandoned which in turn is a continuation-in-part of application Ser. No. 902,750 filed Sep. 2, 1986 now abandoned.

2. BACKGROUND OF TEE INVENTION

2.1. Technical Field

The present invention relates to compositions useful for reducing the amount of formaldehyde released, for example, from durable press treated fabrics and during the manufacture of particleboard. More particularly, the present invention relates to compositions useful as formaldehyde scavengers which are uniquely effective in reducing the amount of formaldehyde released from durable press treated fabrics and during the manufacture of particleboard, and subsequently without detracting from the properties of the fabrics or the particleboard.

The term "fabric" as used herein means products and objects made from natural textile fabrics such as jute, sisal, ramie, hemp, and cotton as well as many of the synthetic organic fibers, such as rayon, cellulose esters, vinyl resin fibers, polyacrylonitrile and copolymers thereof, polymers and copolymers of olefins such as ethylene, polyimide or nylon types, and the like. The fabrics used can be those of a single composition or a mixture of fibers.

The term "durable press treated fabric" as used herein means fabrics as described above which have been imparted with crease and wrinkle resisting properties under both wet and dry conditions by heating, drying, and curing with a finishing agent such as glyoxal resin, formalin, ureaformaldehyde resin, dimethylolurea, dimethyl ether of ureaformaldehyde, melamine formaldehyde resins, cyclic ethylene urea formaldehyde resins, e.g. dimethylol urea, triazine-formaldehyde resins, triazone - formaldehyde resins and the like which are well known in the art and need not be described in detail here.

The term "particleboard" as used herein means an article used in construction of buildings. It is manufactured by compressing sawdust mixed with a resin and heating to cure the resin. The resin is normally a formaldehyde resin.

2.2. Description of Background Art

The uses of formaldehyde and formaldehyde-derived products have been fundamental in the modernization of chemical finishes in the textile industry and for the dry process manufacturing technique in the particleboard industry. Associated with the use of these products, however, is the formation of free or releasable formaldehyde in finished fabrics or garments and during the heating cycle of the manufacture of particleboard, especially if the finished board is exposed to heat and/or humidity.

The released formaldehyde is severely irritating to the eyes, mucous membranes and skin. It is toxic if ingested and may be carcinogenic with prolonged exposure. Accordingly, there has been increasing pressure by environmental, consumer and labor groups to minimize the amount of formaldehyde released for example, from chemically; treated fabrics or particleboards. The federal Occupational Safety and Health Administration ("OSHA") currently is considering proposals that call for limits as low as 0.1 to 0.5 ppm of formaldehyde in the atmosphere at the workplace. Current acceptable formaldehyde emission levels for particleboard are found in the Federal Register, 24 C.F.R., Part 3280, using the Large Chamber Test Method FTM-2 with an upper limit of 0.3 ppm.

Chemical finishing procedures using formaldehyde and formaldehyde derived products are performed principally on those fabrics which are composed either entirely or in part of cellulosic fibers, i.e., cotton and rayon. These fibers have chemically reactive sites (hydroxyl groups) which lend themselves to chemical modification and treatments. Of particular importance in this regard is the treatment of rayon and cotton-containing fabrics with difunctional reagents which are capable of chemically cross-linking the cellulose chains comprising the fibers. Such reactions improve fiber resilience, thereby enhancing wrinkle resistance. and recovery, as well as imparting durable press characteristics to the treated fabrics.

Modern durable press finishing processes follow very closely the original TBL (Tootal, Broadhurst, Lee) process based on water-soluble methylolurea. The fabrics to be treated are padded, foam finished or otherwise impregnated in a continuous manner with a solution of finishing chemicals containing a formaldehyde-derived cross-linking agent and a curing catalyst. The finishing composition ordinarily contains additional compositions such as weight builders and hand modifiers, e.g., softening agents and stiffening agents. Following impregnation, the fabrics are frame dried to fixed dimensions and cured at elevated temperatures. Fabrics finished in this manner are said to possess a memory. For example, a fabric cross-linked in the flat, dry state will return to that state after washing when it is given an opportunity to shed its wrinkles in a tumble dryer.

A urea-glyoxal formaldehyde adduct, 1,3-dimethylol-4, 5-dihydroxyethyleneurea (DMDHEU), has been the primary cross-linking agent in use in the United States since enthusiastic customer acceptance of permanent press products in 1965 prompted a shift from the use of the cyclic ureas, i.e, alkyleneureas, urons and triazones, to a cross-linking system which is lower in formaldehyde release and more resistant to hydrolysis. DMDHEU, a N-methylol cross-linking agent, represents at present the optimum cross-linking agent for fabrics which are composed either entirely or in part of cellulose fibers. The cross-linking reaction of DMDHEU with cellulose is believed to occur principally through the reaction of the pendant DMDHEU N-methylol groups with the hydroxyl groups of the cellulose.

Prior to 1965, it was not unusual for unwashed finished products to release 3,000–5,000 ppm formaldehyde when tested by the AATCC Test Method 112–1978 (Sealed Jar Method). The Sealed Jar Method measures formaldehyde release as a vapor from a fabric stored over water in a sealed jar for 20 hours at 49° C. or 4 hours at 65° C. A reduction in the release of formaldehyde to 2,000 ppm and later 1,000 ppm, was achieved largely through the introduction of DMDHEU as the primary cross-linking agent in durable press finishing processes.

The amount of formaldehyde released as a vapor from a fabric under ambient air conditions (temperature: 23° C.±1°, relative humidity: 55%+2%) can also be measured by the dynamics chamber test method. (Roberts, Eugene C. and Rossano, Anthony J. Jr., AATCC; volume 16, No. 3, p. 29 (1984)).

The modification or alkylation of DMDHEU through the addition of one or more polyhydric alcohols, such as diethylene glycol and sorbitol, to the finishing composition is known to further reduce the amount of formaldehyde released by durable press treated fabrics. Capping of pendant DMDHEU N-methylol groups by the polyhydric alcohols prevents the formation of free formaldehyde in the finishing composition and may reduce formaldehyde release by as much as 50%. Nevertheless, the amount of formaldehyde released from fabrics treated with modified or alkylated DMDHEU remains higher than is acceptable to environmental, consumer and labor groups. Furthermore, in the chemical treatment of fabrics, DMDHEU is generally not the sole source of free formaldehyde. Ordinarily, dyeing and finishing chemical requirements are such that supplemental formaldehyde or formaldehyde-derived chemicals such as dye fixatives, hand modifiers, etc., account for a formaldehyde release which can be substantially higher than that obtained from a simple durable press finishing composition consisting solely of a cross-linking agent and a catalyst.

The incorporation of a formaldehyde scavenger for example, into durable press finishing compositions add the urea-formaldehyde resin is known to reduce the amount of formaldehyde released from durable press treated fabrics and from particleboard respectively. The formaldehyde scavengers reportedly react by two mechanisms. In one mechanism the formaldehyde scavenger may react with free formaldehyde in the finishing composition or the urea-formaldehyde resin to form a stable addition compound at the curing temperature. Alternatively, the formaldehyde scavenger may prevent the formation of free formaldehyde in the finishing composition by capping pendant DMDHEU N-methylol groups and free N-methylol groups produced by the hydrolysis of the cross-link.

An effective formaldehyde scavenger useful in the finishing composition must be water-soluble and able to penetrate the fiber at the reaction site. In addition, an effective formaldehyde must be nonvolatile under curing conditions and compatible with the chemicals of the finishing composition or the urea-formaldehyde resin composition. It must not be so basic as to inactivate the catalyst and promote hydrolysis of the N-methylol groups to N-H and formaldehyde. At the same time, it must not be so acidic as to hydrolyze the cross-link during the sealed jar test. A formaldehyde scavenger must not adversely; affect fabric properties such as hand, shrinkage, mullins burst and shade or whiteness or the mechanical properties of the particle-board. And, of course, it must be economical to use in production and efficient at reasonable levels such as 1–3% solids on the weight of the bath ("owb").

Heretofore, the prior art has not disclosed a formaldehyde scavenger, suitable for use in the durable press treatment of fabrics or in the maintenance of particleboard, which is effective in reducing released formaldehyde to the low levels which are currently desired without detrimental effects on fabrics or particleboard properties. Currently, the formaldehyde scavengers most widely used in durable press finishing compositions are polyhydric alcohols, such as diethylene glycol and sorbitol and in the manufacture of particleboard are-nitrogen containing compounds such as urea, melamine, diazine, triazine and amine compounds (U.S. Pat. No. 4,559,097). Compounds such as these, however, are not sufficiently effective in reducing formaldehyde levels to produce the low levels which are currently desired.

Nitrogenous compounds such as urea, ethyleneurea and, in particular, carbohydrazide are known to effectively reduce formaldehyde levels but only at the expense of the properties of the fabrics. Residual amide (—CONH) groups in the treated fabrics cause chlorine retention and possible fabric yellowing as well as a reduction in the lightfastness of certain azo dyes. These side effects preclude the wide use of nitrogenous compounds as formaldehyde scavengers in durable press finishing processes. Further, the nitrogenous compounds and the resin components of the urea-formaldehyde resin composition may react, decreasing the strength of the particleboard. These side effects preclude the wide use of nitrogenous compounds as formaldehyde scavengers in particleboard.

Dimethyl-1,3-acetonedicarboxylate, diethyl malonate and ethylacetoacetate, three active methylene compounds, have been suggested by Thomasino et al, in *Textile Chemist and Colorist*, vol. 16, No. 12, Dec. 1985, as possible formaldehyde scavengers with dimethyl-1,3-acetonedicarboxylate being particularly effective in reducing formaldehyde release under laboratory conditions. In laboratory tests, these compounds are found to be effective in reducing the amount of formaldehyde released by fabrics treated with a durable press finishing composition comprising DMDHEU without detrimental effects on fabric properties. These compounds, however, are insoluble or of relatively low solubility insoluble in water and therefore are not suitable for use in present durable press finishing processes.

Accordingly, it is an object of the present invention to provide a novel composition for a formaldehyde scavenger which is effective in reducing the amount of formaldehyde released for example, from durable press treated fabrics without detracting from the properties of the fabrics and from particleboard without detracting from the mechanical properties of the particleboard.

It is yet another object of the present invention to provide a method of reducing the amount of formaldehyde released for example, from durable press treated fabrics without detracting from the properties of the fabrics and from particleboard without detracting from the mechnical properties of the particleboard.

These and other objects of the invention, as well as a fuller understanding of the advantage thereof, can be had by reference to the following description and claims.

3. SUMMARY OF THE INVENTION

The foregoing objects are achieved according to the present invention by novel compositions for formaldehyde scavengers comprising a water-soluble active methylene compound of the formula

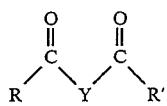

wherein R is —CH$_3$ or H[O(CH$_2$)$_m$]$_n$O—, R' is —CH$_3$ or H[(O(CH$_2$)$_{m'}$]$_{n'}$O—, m and/or m' are 1-3, and n and/or n' are 1-19, Y is —CH$_2$ or —CH$_2$—CO—CH$_2$— and, preferably, m and/or m' are 2, n and/or n' are 1-3 and Y is —CH$_2$. The compositions of the present invention are suitable for use in durable press finishing processes and for use in particleboard manufacturing processes.

According to the present invention, the said water soluble active methylene compounds are obtained by the transesterification of dialkyl malonate or alkylacetoacetate by heating and stirring it under anhydrous conditions with a substituted or unsubstituted polyhydric alcohol and a suitable transesterification catalyst such as concentrated H$_2$SO$_4$ (99%). In the aforesaid transesterification, the preferred dialkyl malonate and alkylacetoacetate are diethyl malonate and ethylacetoacetate respectively, the substituted or unsubstituted polyhydric alcohol is diethylene glycol. However, the reaction is not restricted to the alkyl esters as starting materials. These esters are used primarily because they are commercially available and less costly. The mixture is heated and stirred. The reaction mixture may optionally be placed under a vacuum in order to facilitate the removal of alkanol generated by the esterification process. Completion of the reaction may be determined by the testing of an aliquot of the reaction mixture for water solubility. Alternatively, the class of ester compounds including ethylacetoacetate may also be prepared by addition reaction of diketene (vinylaceto-β-lactone) with the appropriate substituted or unsubstituted polyhydric alcohol.

The obtained water-soluble active methylene compound may be used in a manner analogous to known formaldehyde scavengers. For example, the water-soluble active methylene compound may be diluted to approximately 90% solids for the class of ester compounds including bis (2-hydroxyethoxyethyl) malonate class and 50% solids for the class of ester compounds including (2-hydroxyethoxyethyl) acetoacetate; the resultant solution is neutralized to a pH of 6 to 7 in order to convert residual H$_2$SO$_4$ (a resin catalyst) to Na$_2$SO$_4$ and thereby prevent problems such as yellowing of treated fabric. The water-soluble active methylene solution may be incorporated into a durable press finishing composition comprising, for example, an N-methylol cross-linking systems, such as DMDHEU or modified DMDHEU.

A fabric composed either entirely or in part of cellulose fibers may be padded, foam finished or otherwise impregnated with the durable press finishing composition.

When padding a fabric with the durable press finishing composition, the finishing composition is composed as follows:

TABLE I

| Components | Percent Solids owb | Preferred |
| --- | --- | --- |
| DMDHEU | 3-10 | 8 |
| Catalyst | 0.5-3 | 1.6 |
| Diethylene glycol | 1-5 | — |
| Dis (2-hydroxyethoxyethyl) malonate solution | 1.25-5 | 1.9 |
| (2-hydroxyethoxyethyl) acetoacetate | 1-4 | — |

When foam finishing a fabric with the durable press finishing composition, the foam solution is highly concentrated and the concentration of each component of the solution increases proportionally. For example, the concentration of each component may be double that of each component of a padding solution, in which case, the water-soluble active methylene solution is incorporated into the finishing composition in an amount ranging from 2-10% solids owb for compounds such as bis (2-hydroxyethoxyethyl) malonate and 2 to 8% solid owb for compounds such as (2-hydroxyethoxyethyl) acetoacetate.

Subsequent to treatment with the finishing composition, the fabric is dried and cured according to the usual manner.

In another example, the active methylene compound may be added directly to the urea-formaldehyde resin used in the manufacture of particleboard or diluted with water and sprayed on the surface of the board before it is pressed. The amount of scavenger applied or added depends on the nature of the resin added to the particleboard and the curing conditions. However, the correct amount for any particular case may be determined by testing various amounts of scavenger and evaluating the amount of formaldehyde released by the board.

The water-soluble active methylene compounds of the present invention are uniquely effective in reducing the amount of formaldehyde released for example from fabrics treated with a durable press finishing composition comprising, for example, an N-methylol cross-linking agent, such as DMDHEU or modified DMDHEU and from the urea-formaldehyde resin comprising the particleboard. Free formaldehyde in such a finishing composition or in the formaldehyde resin reacts with the active methylene group of the formaldehyde scavenger to form a stable addition compound under curing conditions, such as methylene malonate or methylene acetoacetate or a polymeric form thereof. The amount of formaldehyde released form fabrics treated with a durable press finishing composition prepared according to the present invention or during the manufacture of particleboard in which the urea-formaldehyde resin is treated with the compound of the present invention are reduced to acceptably low levels. The levels of formaldehyde are reduced to below 100 ppm without detrimental effects on fabric properties such as hand, shrinkage, mullins burst and shade or whiteness in fabric applications and 65% of the original level in particleboard applications without detrimental effects on the strength of the particleboard due to the influence on the adhesive and/or inactivation of the formaldehyde catalyst respectively.

Further, the active methylene compound of the present invention may be used in the production of fiberboard and other fibrous articles, such as hardboard and insulation board; chipboard; plywood; oriented strand board; and waferboard.

BRIEF DESCRIPTION OF THE DRAWINGS

FIGS. I and II show the decrease of formaldehyde content of treated fabric over time when the instant scavenger is used.

4. DESCRIPTION OF PREFERRED EMBODIMENTS

Figure 1:
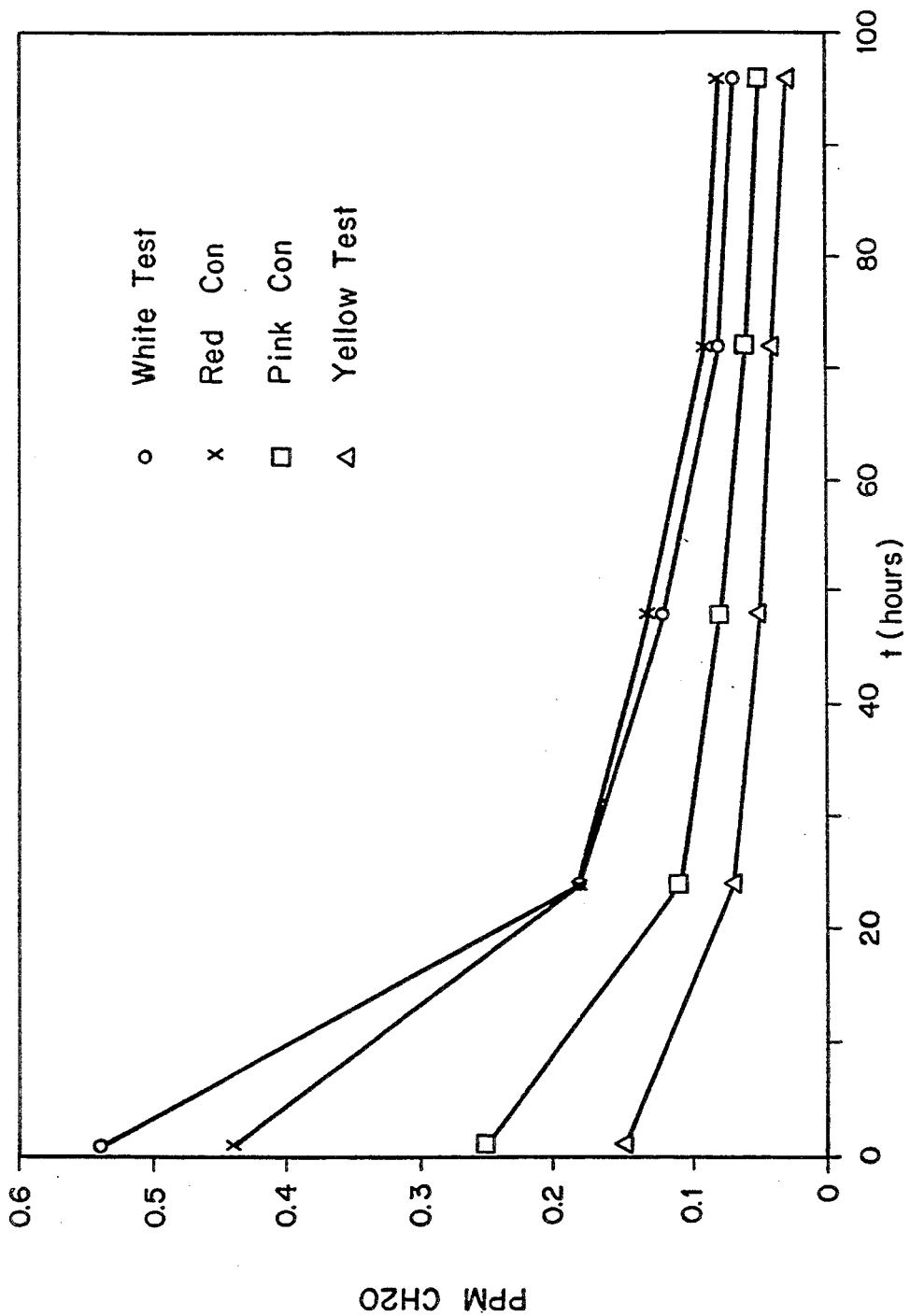

The following nonlimiting examples are intended to illustrate the compositions, methods and products of the invention and the advantages thereof.

4.1. EXAMPLE 1

In the following procedure, (2-hydroxyethoxyethyl) acetoacetate, a water-soluble active methylene compound of the formula

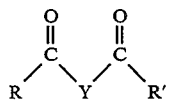

wherein R is $-CH_3$, Y is $-CH_2$, R' is $H[O(CH_2)_{m'}]_{n'}-O-$, m' is 2, and n' is 2, is prepared by the transesterification of ethylacetoacetate with diethylene glycol.

A quantity of ethylacetoacetate is mixed with diethylene glycol in a mole ratio of 1:1.1 to prevent polymer formation. Concentrated sulphuric acid (99%) is then added to the mixture in a ratio of 0.2 ml sulphuric acid: 1 mole ethylacetoacetate to catalyze the reaction. The temperature of the mixture is heated to 95° C. to 100° C. under stirring. A water aspirator is used to facilitate the removal of ethanol generated by the esterification process. Completion of the reaction is determined by the testing of an aliquot of the reaction mixture for water solubility.

The product (2-hydroxyethoxyethyl) acetoacetate is obtained in high yield. The structure of the (2-hydroxyethoxyethyl) acetoacetate is confirmed by FTIR as well as proton and carbon 13 NMR.

The (2-hydroxyethoxyethyl) acetoacetate is a clear liquid of moderate viscosity which readily dissolves in water to form a solution, is diluted to 90% solids and neutralized to a pH of 6.75. The resulting solution is ready for use.

4.2. EXAMPLE 2

Bis ( 2-hydroxyethoxyethyl ) malonate, a water-soluble active methylene compound of the formula

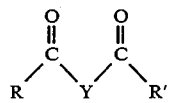

wherein R is $H[O(CH_2)_m]_n-O-$, y is $-CH_2$, R' is $H[O(CH_2)_{m'}]_{n'}-O-$, m and/or m' are 2, and n and/or n' are 2, is prepared by the transesterification of diethyl malonate with diethylene glycol.

A quantity of diethyl malonate is mixed with diethylene glycol in a mole ratio of 1: 2.2. Concentrated sulphuric acid is then added to the mixture in a ratio of 0.2 ml sulphuric acid: 1 mole diethyl malonate to catalyze the reaction. The temperature of the mixture is heated to 95° C. to 100° C. under stirring. A water aspirator is used to facilitate the removal of ethanol generated by the esterification process. Completion of the reaction is determined by the testing of an aliquot of the reaction mixture for water solubility.

The product bis (2-hydroxyethoxyethyl ) malonate is obtained in high yield. The structure of the bis (2-hydroxyethoxyethyl) malonate is confirmed by FTIR as well as proton and carbon 13 NMR.

The bis (2-hydroxyethoxyethyl) malonate, a clear liquid of moderate viscosity which readily dissolves in water to form a solution, is diluted tp 50% solids and neutralized to a pH of 6.75. The resulting solution is ready for use.

4.3. EXAMPLE 3

A series of experiments, using bleached white interlock knit fabrics, are carried out in order to determine the effectiveness of (2-hydroxyethoxyethyl) acetoacetate in reducing the amount of formaldehyde released from fabrics treated with durable press finishing compositions comprising DMDHEU.

The durable press finishing compositions are composed as follows:

TABLE II

| Components | Percent Solids owb |
|---|---|
| DMDHEU | 8.0 |
| Catalyst | 1.4 |
| Hand Builder | 5.5 |
| Softener | 1.4 |
| (2-hydroxyethoxyethyl) acetoacetate solution | 1.4 (See Table III) |

The fabric samples are run on a Fab Con tubular knit resinating range. Fifty percent of each production lot (1,000/lot) are padded with durable press compositions comprising (2-hydroxyethyoxyethyl) acetoacetate while the remaining fifty percent served as the control fabrics. Bleached white polyester cotton interlock knit fabric samples are dried at 275° F. and loop cured at 310° F. The cured samples are submitted for testing according to the AATCC Test Method 112-1984. The test results are summarized in Table III.

TABLE III

| Production Trial | Bis (2-hydroxyethoxyethyl) acetoacetate solution, % solids owb | Released Formaldehyde, ppm | Released Formaldehyde, % reduction |
|---|---|---|---|
| 1. White Interlock Knit Fabric | 0 (control) 1.4 | 393 252 | 0 36 |

Conditions: Resinate and dry at 275° F.; loop cure at 310° F.

A review of the data shows that in trial 1, a significant reduction on released formaldehyde is obtained from fabrics treated with a durable press finishing composition comprising (2-hydroxyethoxyethyl) acetoacetate. As a result of the incorporation of bis (2-hydroxyethoxyethyl) acetoacetate into the durable press finishing compositions, the level of released formaldehyde is reduced to acceptably low level.

4.4. EXAMPLE 4

A series of experiments, using bleached white PC interlock knit fabrics are carried out in order to determine the effectiveness of bis (2-hydroxyethoxyethyl) malonate in reducing the formaldehyde released from fabrics treated with DMDHEU in the presence of diethylene glycol.

The durable press finishing compositions are composed as follows:

TABLE IV

| Components | Percent Solids owb |
|---|---|
| DMDHEU (resin base) | 8 |
| Catalyst | 1.6 |
| Diethylene glycol | 2.0 |
| Bis (2-hydroxyethoxyethyl) malonate | 1.25–5.00 |

Samples of fabric are padded at 80% WPU with durable press finishing compositions comprising bis (2-hydroxyethoxyethyl) malonate solutions in amounts ranging from 1.25–5.00% solids owb. The padded samples are dried together at 250° F. and cured individually in a curing oven of from 295° F. to 310° F. and for time periods of from 30 seconds to 120 seconds.

The cured samples are submitted for testing according to the AATCC Test Method 112–1984. This method is similar to AATCC Test Method 112–1978 except that a chromotropic acid colorimetric method is used as an alternate to the Nash reagent for the determination of the formaldehyde content in the sample jars after the incubation. The test results are summarized in Table V.

TABLE V

| Laboratory Trial | Bis (2-hydroxyethoxyethyl) malonate solution, percent solids owb | Cure Temp., °F. | Cure Time, sec. | Released Formaldehyde, ppm | Released Formaldehyde, % reduction |
|---|---|---|---|---|---|
| 1 | 0 (control) | 310 | 120 | 231 | 0 |
|   | 1.25 | 310 | 120 | 152 | 34 |
|   | 2.50 | 310 | 120 | 102 | 56 |
| 2 | 0 (control) | 310 | 30 | 628 | 0 |
|   | 2.5 | 310 | 30 | 437 | 30.4 |
|   | 0 (control) | 310 | 60 | 634 | 0 |
|   | 2.5 | 310 | 60 | 320 | 49.8 |
|   | 0 (control) | 310 | 120 | 245 | 0 |
|   | 0 (control) | 310 | 120 | 176 | 39.2 |
| 3 | 0 (control) | 295 | 80 | 376 | 0 |
|   | 1.25 | 295 | 80 | 273 | 27.4 |
|   | 2.50 | 295 | 80 | 185 | 50.8 |
|   | 3.75 | 295 | 80 | 176 | 53.2 |
|   | 5.00 | 295 | 80 | 154 | 59.0 |

A review of the data shows that in all trials, a substantial reduction of formaldehyde released are obtained by fabrics treated with durable press finishing compositions containing bis (2-hydroxyethoxyethyl) malonate.

As demonstrated in Laboratory Trial No. 1, the amount of formaldehyde released from durable press treated fabrics may be reduced by more than 50% by the incorporation of bis (2-hydroxyethoxyethyl) malonate into the durable press finishing composition.

In Laboratory Trial No. 2, efficient formaldehyde scavenging is observed in fabric samples not fully cured at second and 60 second cure times. Because the percent cure of fabrics may vary in production, it is significant that bis (2-hydroxyethoxyethyl) malonate is able to maintain its effectiveness an the presence of sizable variations in percent cure.

As demonstrated in Laboratory Trial No. 3, bis (2-hydroxyethoxyethyl) malonate is efficient in small amounts. The optimum level of the bis (2-hydroxyethoxyethyl) malonate solution in the finishing composition is 2.5% solids owb.

The properties of the treated fabrics are not affected by the inclusion of bis (2-hydroxyethoxyethyl) malonate into the finishing compositions. The fabric samples treated with durable press finishing compositions containing bis (2-hydroxyethoxyethyl) malonate have the same hand and whiteness as the control fabrics.

The substantial reductions in the release of formaldehyde obtained by bis (2-hydroxyethoxyethyl) malonate in the presence of diethylene glycol indicates that the mechanism for reducing formaldehyde release is the reaction of bis (2-hydroxyethoxyethyl) malonate with free formaldehyde in the finishing composition to form a stable addition compound. In the presence of a substituted or unsubstituted polyhydric alcohol such as diethylene glycol, capping of pendant DMDHEU N-methylol groups by bis (2-hydroxyethoxyethyl) malonate would be expected to show a decrease in efficiency due to competition of the alcohol with DMDHEU for reaction with the formaldehyde scavenger.

The substantial reductions of released formaldehyde obtained by bis (2-hydroxyethoxyethyl) malonate in the presence of diethylene glycol demonstrates, in addition, that the efficiency of bis (2-hydroxyethoxyethyl) malonate as a formaldehyde scavenger is due to the active methylene site on the formaldehyde scavenger and not to unreacted diethylene glycol in the reaction mixture or to the ethoxyethylester groups of the bis (2-hydroxyethoxyethyl) malonate.

4.5. EXAMPLE 5

A series of experiments, using pink interlock knit fabrics, is carried out in order to determine the effectiveness of (2-hydroxyethoxyethyl) acetoacetate in reducing the amount of formaldehyde released from fabrics treated with durable press finishing compositions comprising modified DMDHEU.

The durable press finishing compositions are composed as follows:

TABLE VI

| Components | Percent Solids owb |
|---|---|
| Modified DMDHEU (Pre-Catalyzed) | 9.88 |
| Hand Builder | 5.5 |
| Softener | 1.4 |
| (2-hydroxyethoxyethyl) acetoacetate solution | 1.4 (See Table VII) |

The fabric samples are run on a Fab Con tubular knit resinating range. Fifty percent of each production lot (1,000/lot) are padded with durable press finishing compositions comprising (2-hydroxyethoxyethyl) acetoacetate which the remaining fifty percent served as the control fabrics. Pink interlock knit fabric samples are dried at 275° F. and loop cured at 310° F. The cured samples are submitted for testing according to the AATCC Test Method 112-1984. The test results are summarized in Table VII.

TABLE VII

| Production Trial | Bis (2-hydroxy-ethoxyethyl) acetoacetate solution, % solids owb | Released Formaldehyde, ppm | Released Formaldehyde, % reduction |
|---|---|---|---|
| 1. Pink Interlock Knit Fabric | 0 (control)<br>1.4 | 98<br>43 | 0<br>56 |

Conditions: Resinate and dry at 275° F.; loop cure at 320° F.

A review of the data shows that in trial 1, a signifiant reduction on released formaldehyde is obtained from fabric treated with a durable press finishing composition comprising (2-hydroxyethoxyethyl) acetoacetate. As a result of the incorporation of bis (2-hydroxyethoxyethyl) acetoacetate into the durable press finishing compositions, the level of released formaldehyde is reduced to acceptably low levels.

4.6. EXAMPLE 6

A series of experiments, using bleached white PC and flame red interlock knit fabrics, are carried out in order to determine the effectiveness of bis (2-hydroxyethoxyethyl) malonate in reducing the amount of formaldehyde released from fabrics treated with a modified pre-catalyzed DMDHEU resin.

The durable press finishing compositions are summarized in Table VIII.

TABLE VIII

| Components | Percent Solids owb |
|---|---|
| Modified DMDHEU (Pre-Catalyzed) | 9.88 |
| Hand Builder | 5.5 |
| Softener | 1.4 |
| Bis (2-hydroxyethoxyethyl) malonate solution | 2.2–2.5 |

The fabric samples are run on a Fab Con tubular knit resinating range. Ten percent of each production lot (1,000/let) were padded with durable press finishing compositions comprising bis (2-hydroxyethoxyethyl ) malonate, while the remaining ninety percent served as the control fabrics. Flame red fabric samples are dried at 275° F. and loop cured at 320° F.; bleached white fabric samples are dried at 275° F. and loop cured at 310° F. The cured samples are submitted far testing according to the AATCC Test Method 112-1978. The test results are summarized in Table 1X.

TABLE IX

| Production Trial | Bis (2-hydroxy-ethoxyethyl) malonate solution, percent solids owb | Released Formaldehyde ppm | Released Formaldehyde, % reduction |
|---|---|---|---|
| 1. Flame Red Interlock Knit Fabric | 0 (control)<br>2.2 | 190<br>80 | 0<br>58 |

Conditions: Resinate and dry at 275° F.; loop cure at 320° F.

| 2. White Interlock Knit Fabric | 0 (control)<br>2.5 | 248<br>95 | 0<br>62 |

Conditions: Resinate and dry at 275° F.; loop cure at 310° F.

A review of the data shows that in each trial, a significant reduction of released formaldehyde is obtained from fabric treated with a durable press finishing composition comprising bis(2-hydroxyethoxyethyl) malonate. As a result of the incorporation of bis (2-hydroxyethoxyethyl) malonate into the durable press finishing compositions, the levels of released formaldehyde are reduced in each case by more than 50%. The amount of formaldehyde released by the . treated fabrics is reduced to acceptably low levels, below 100 ppm.

The properties of the fabrics treated with durable press finishing compositions containing bis (2-hydroxyethoxyethyl) malonate are compared to the properties of the control fabrics. The results are summarized in Table X.

TABLE X

| Production Trial | Shrinkage | Mullins | Shade | Hand |
|---|---|---|---|---|
| 1. Flame Red Interlock Knit Fabric | 1 × 5 | 76 | No Change | No Change |
| Control Fabric | 1.5 × 5 | 81 | | |
| 2. White Interlock Knit Fabric | 3 × 4 | 89 | No Change | No Change |
| Control Fabric | 2 × 4 | 85 | | |

As is apparent form the results shown in Table X, the incorporation of bis (2-hydroxyethoxyethyl) malonate into the finishing composition does not have a detrimental effect on the properties of the treated fabrics.

The effectiveness of bis (2-hydroxyethoxyethyl) malonate in the presence of modified DMDHEU indicates that the mechanism for reducing the levels of released formaldehyde is the trapping of free formaldehyde in the finishing composition at the curing temperature. The active methylene site on bis (2-hydroxyethoxyethyl) malonate reacts with free formaldehyde to form a stable addition compound, such as methylene malonate or a polymeric form thereof.

4.7. EXAMPLE 7

A series of experiments using bleached white interlock 50/50 PC knit fabrics, are carried out in order to determine the effectiveness of bis (2-hydroxyethoxyethyl) malonate and (2-hydroxyethoxyethyl) acetoacetate in reducing the amount of formaldehyde released from fabric treated with melamine resin. The durable press finishing compositions are composed as follows:

TABLE XI

| Components | Percent solids owb |
|---|---|
| Melamine | 9 |
| Catalyst | 2.4 |
| Bis (2-hydroxyethoxyethyl) malonate | 1.9 (See Table XII) |
| (2-hydroxyethoxyethyl) acetoacetate | 1.4–2.7 (See Table XII) |

Samples of fabrics are padded at 80% WPU with durable press finishing compositions comprising bis (2-hydroxyethoxyethyl) malonate and (2-hydroxyethoxyethyl) acetoacetate solution. The padded samples are dried together at 265° F. and cured individually for 120 seconds at 320° F. The cured samples are submitted for testing according to the AATCC Test Method 112-1984. The results are summarized in Table XII.

TABLE XII

| Laboratory Trial | Bis (2-hydroxy-ethoxyethyl) malonate % solids owb | (2-hydroxy-ethoxyethyl) acetoacetate % solids owb | Released Formaldehyde ppm | Released Formaldehyde % reduction |
|---|---|---|---|---|
| 1 | 0 (control) | 0 (control) | 3420 | 0 |

TABLE XIV

| Laboratory Trial | Bis (2 hydroxyethoxyethyl) malonate percent solids owb | (2-hydroxyethoxyethyl)acetoacetate percent solids owb | Released formaldehyde ppm | Released formaldehyde % red. |
|---|---|---|---|---|
| 1 | 0 (control) | 0 (control) | 593 | 0 |
|   | 1.9 | 0 | 489 | 18 |
|   | 0 | 1.9 | 359 | 39 |
| 2 | 0 (control) | 0 (control) | 635 | 0 |
|   | 1.9 | 0 | 460 | 28 |
|   | 0 | 1.9 | 298 | 53 |
| 3 | 0 (control) | 0 (control) | 776 | 0 |
|   | 1.9 | 0 | 472 | 39 |
|   | 0 | 1.9 | 362 | 53 |
| 4 |   | 0 (control) | 616 | 0 |
|   | — | 1 | 424 | 31 |
|   | — | 2 | 336 | 45 |
|   | — | 4 | 211 | 66 |
| (conditions: Predried at 265° F., cured for 220 sec. at 320° F.) | | | | |
| 5* | — | 0 (control) | 515 | 0 |
|   | — | 1 | 313 | 39 |
|   | — | 2 | 213 | 59 |
|   | — | 3 | 125 | 76 |
| 6** | — | 0 (control) | 702 | 0 |
|   | — | 1.4 | 413 | 41 |
|   | — | 2.8 | 290 | 59 |

*Trial is run by an independent laboratory on 50/50 PC sheeting. The samples are cured for 1.5 minutes at 350° F.
_ Prepare by method disclosed in my U.S. application Serial No. 902,750, filed September 2, 1986 now abandoned.

| Laboratory Trial | Bis (2-hydroxyethoxyethyl) malonate % solids owb | (2-hydroxyethoxyethyl) acetoacetate % solids owb | Released Formaldehyde ppm | Released Formaldehyde % reduction |
|---|---|---|---|---|
|   | 1.9 | 0 | 3488 | 0 |
|   | 0 | 1.9 | 2577 | 25 |
| 2 | — | 0 (control) | 3323 | 0 |
|   | — | 1.4 | 2672 | 20 |
|   | — | 2.8 | 2599 | 22 |

4.8. EXAMPLE 8

A series of experiments, using bleached white 50/50 PC interlock knit fabric are carried out in order to determine the effectiveness of (2-hydroxyethoxyethyl) acetoacetate in reducing the formaldehyde released from fabrics treated with DMDHEU type resin base and to determine its efficiency with respect to bis (2-hydroxyethoxyethyl) malonate.

The durable press finishing compositions are composed as follows:

TABLE XIII

| Components | Percent Solids owb |
|---|---|
| DMDHEU (Resin Base) | 8 |
| Catalyst | 1.6 |
| Bis (2-hydroxyethoxyethyl) malonate | 1.9 (see Table XIV) |
| (2-hydroxyethoxyethyl) acetoacetate | 1–4 (see Table XIV) |

Samples of fabric are padded at 80% WPU with durable press finishing compositions comprising bis (2-hydroxyethoxyethyl) malonate solutions at 1.9% solids owb or (2-hydroxyethoxyethyl) acetoacetate at 1–4% solids owb. The padded samples are dried together at 265° F. and cured individually in a curing oven at 320° F. for 120 seconds. The cured samples are submitted for testing according to the AATCC Test Method 112-1984. This method is similar to AATCC Test Method 112-1978 except that a chromotropic acid colorimetric method is used as an alternate to the Nash reagent for the determination of the formaldehyde content in the sample jars after the incubation. The test results are summarized in Table XIV.

A review of the data shows that in each trial, a reduction of released formaldehyde is obtained from fabric treated with a durable press finishing composition comprising bis (2-hydroxyethoxyethyl) malonate and (2-hydroxyethoxyethyl) acetoacetate.

In Laboratory Trials 1–3, a comparison of the two scavengers is made at 1.9% solids owb. The (2-hydroxyethoxyethyl) acetoacetate is more effective at this level than the bis (2-hydroxyethoxyethyl) malonate.

Laboratory trials 1–5 indicates that approximately 2% owb serves as an optimal value for the (2-hydroxyethoxyethyl) acetoacetate scavenger for a DMDHEU resin.

4.9. EXAMPLE 9

A series of experiments, using bleached white 50/50 PC interlock unit fabric are carried out in order to determine the effectiveness of bis (2-hydroxyethoxyethyl) malonate and (2-hydroxyethoxyethyl) acetoacetate in reducing the formaldehyde released in fabrics treated with a modified pre-catalyzed DMDHEU resin and to determine the efficiency of both scavengers with respect to each other. The durable press finishing compositions are composed as follows:

TABLE XV

| Components | Percent solids owb |
|---|---|
| Modified DMDHEU (pre-catalyzed) | 8 |
| Bis (2-hydroxyethoxyethyl) malonate | 1.9 (see Table XVI) |
| (2-hydroxyethoxyethyl) acetoacetate | 1.4–2.8 (see Table XVI) |

The samples of fabric are padded at 80% WPU with durable press finishing compositions comprising bis (2-hydroxyethoxyethyl) malonate solutions at 1.9% solids owb or (2-hydroxyethoxyethyl) acetoacetate at 1.4–2.8% solids owb. The padded samples are dried together at 265° F. and cured individually in a curing oven at 320° F. for 120 seconds. The cured samples are submitted for testing according to the AATCC Test Method 112-1984. The test results are summarized in Table XVI.

TABLE XVI

| Laboratory Trial | Bis (2 hydroxyethoxyethyl) malonate percent solids owb | (2-hydroxyethoxyethyl)acetoacetate per. solids owb | Released formaldehyde ppm | Released formaldehyde percent red. |
|---|---|---|---|---|
| 1 | 0 (control) | 0 (control) | 197 | 0 |
|   | 1.9 | 0 | 153 | 22 |
|   | 0 | 1.9 | 70 | 64 |
| 2 | 0 (control) | 0 (control) | 90 | 0 |
|   | 1.9 | 0 | 65 | 28 |
|   | 0 | 1.9 | 28 | 69 |
| 3 | 0 (control) | 0 (control) | 101 | 0 |
|   | 1.9 | 0 | 74 | 27 |
|   | 0 | 1.9 | 20 | 80 |
| 4 | — | 0 (control) | 105 | 0 |
|   | — | 1.4 | 5 | 95 |
|   | — | 2.8 | 0 | 100 |

(conditions: Predried at 265° F., cured for 120 sec. at 320° F.)

A review of the data shows that in each trial, the (2-hydroxyethoxyethyl) acetoacetate scavengers are much more effective in reducing formaldehyde released than the bis (2-hydroxyethoxyethyl) malonate at the 1.9% solids level, using modified DMDHEU precatalyzed resins.

4.10. EXAMPLE 10

A series of experiments, using eight different fabric lots, four of which are control lots, are carried out in order to determine the effectiveness of bis (2-hydroxyethoxyethyl) malonate (FSD-90) in reducing the amount of formaldehyde released from fabrics treated with durable press finishing compositions comprising DMDHEU.

The durable press finishing compositions are composed as follows:

TABLE XVII

| Components | Percent Solids owb |
|---|---|
| DMDHEU | 9.88 |
| Hand Builder | 5.5 |
| Softener | 1.4 |
| bis (2-hydroxyethoxyethyl) malonate solution | 2 |

Figure 2:
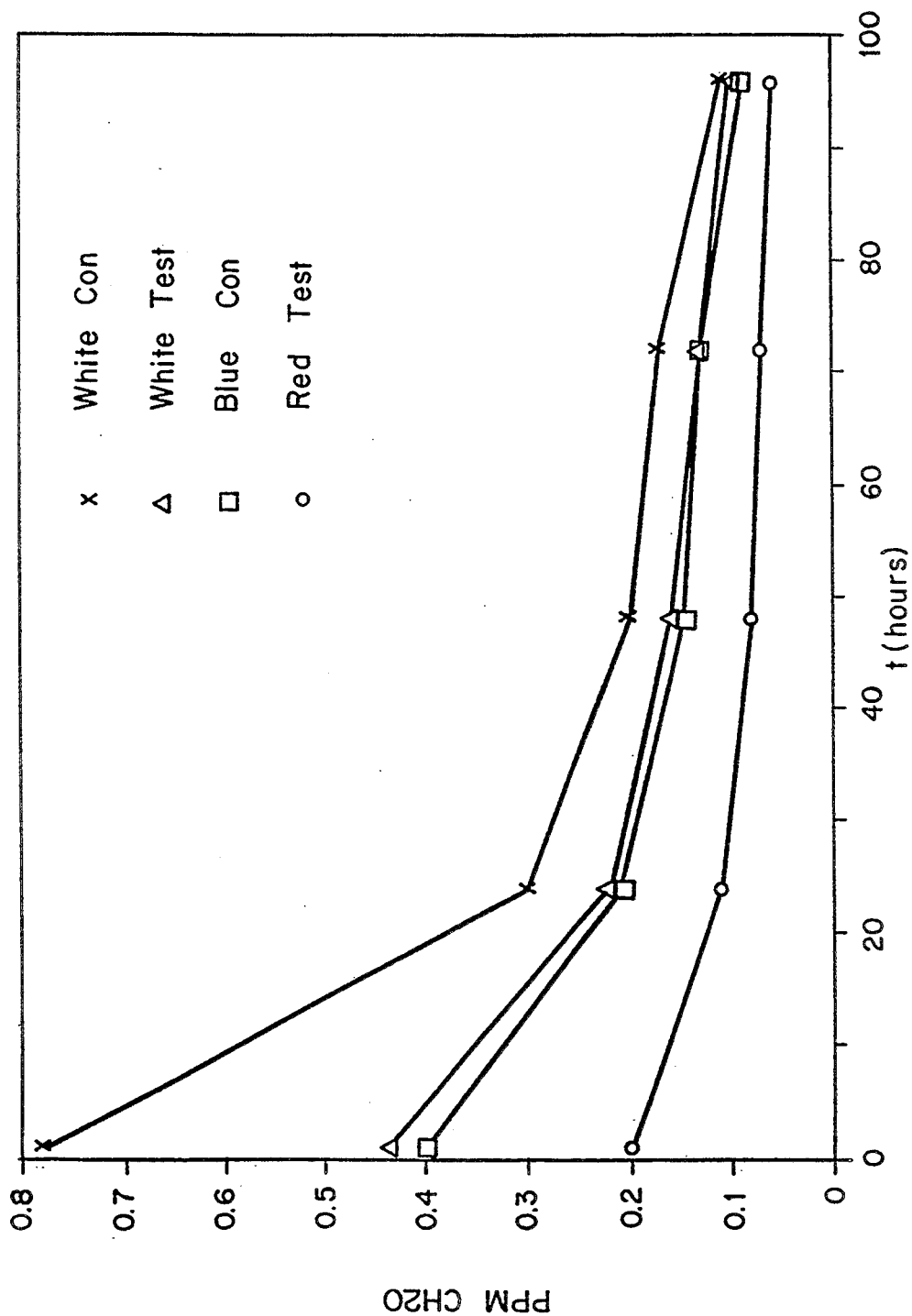

The fabric samples are run on a Fab Con tubular knit resinating range. The eight different fabric lots (1,000/lot) are padded with durable press finishing compositions comprising bis (2-hydroxyethoxyethyl) malonate of which four of the lots are control fabrics. The eight different fabric lots are dried at 275° F. and loop cured at 310° F. The cured samples are submitted for testing according to the AATCC Test Method 112-1984 and the dynamic chamber test method. The lots are tested for off-gassing for 96 hours. The test results are summarized in Table XVIII and FIGS. 1 and 2.

TABLE XVIII

| Production Trial | Released Formaldehyde ppm (AATCC-112) | Released Formaldehyde ppm (Dynamic Chamber Test Method) Hours For Off-Gassing | | | | |
|---|---|---|---|---|---|---|
|   |   | 1 | 24 | 48 | 72 | 96 |
| A. Control |   |   |   |   |   |   |
| 1. White | 237 | .78 | .30 | .20 | .17 | .11 |
| 2. Pink | 105 | .25 | .11 | .08 | .06 | .05 |
| 3. Red | 136 | .44 | .18 | .13 | .09 | .08 |
| 4. Blue | 230 | .40 | .21 | .15 | .13 | .09 |
| B. Test |   |   |   |   |   |   |
| 5. White | 125 | .44 | .22 | .16 | .13 | .10 |
| 6. White | 123 | .54 | .18 | .12 | .08 | .07 |
| 7. Yellow | 53 | .15 | .07 | .05 | .04 | .03 |
| 8. Red | 85 | .20 | .11 | .08 | .07 | .06 |

When the data on the level of formaldehyde released as shown in Table XVIII are grouped by color of fabric (e.g. white fabric vs. dyed) and averaged, the control fabric measured by the dynamic chamber test method gives a release of 0.57 ppm formaldehyde at 1 hour sampling and the test fabrics that have bis (2-hydroxyethoxyethyl) malonate in the finish mix at a 2% level owb as a group gives 0.33 ppm or a 42% reduction in formaldehyde off-gassing level. Formaldehyde levels on white fabric can be expected to be higher in general since bleached whites are cured at a much lower temperature than dyed fabric in order to prevent thermal discoloration. The odor formaldehyde data, for the white fabrics, when group and average, shows a 46% reduction in the level of formadehyde released.

The data from the trials clearly shows that bis (2-hydroxyethoxyethyl) malonate when used in a standard resin mix (DMDHEU Type), does reduce the odor formaldehyde level in fabric and this is translated into a reduction in off-gassing of formaldehyde from that fabric.

4.11. EXAMPLE 11

On a factory-scale, 24,000 lbs. of particleboards are produced according to the following:

The formaldehyde scavenger of Example 2 is added in an amount of 6 lbs. (approximately 0.3% based on solution weight) to 250 gallons of a urea-formaldehyde resin (65% solids) and wax (approximately 2.3% based on solids) mixture and sprayed on fine sawdust particles.

The sawdust is then spread by transfer onto trays with the two layers of fine particles on the face side of the board, with the coarse particles situated at the core then hot pressed at 375° F. for four minutes.

The cured samples are submitted for testing according to the standard 24 Hour Dessicator method. The Dessicator method is a quality control test that each mill will run and reference against the Large Chamber Test Method FTM-2, 1987. The level of released formaldehyde (0.1 ppm) is reduced by 35%.

4.12. EXAMPLE 12

On a factory-scale, 24,000 lbs. of particleboards are produced according to the following:

The formaldehyde scavenger of Example 1 or Example 2 is added in an amount of 6 lbs. (approximately 0.3% based on solution weight) to 250 gallons of a urea-formaldehyde resin (65% solids) and wax (approximately 2% based on solids) mixture and sprayed on fine sawdust particles.

The sawdust is then spread by transfer onto trays with the two layers of fine particles on the face side of the board, with the coarse particles situated at the core then hot pressed at 375° F. for four minutes.

The measurements of the reduction of formaldehyde released are performed by the two hour dessicator method for the two scavengers, bis (2-hydroxyethoxyethyl) malonate and (2-hydroxyethoxyethyl) acetoacetate at three application levels, two cure times and two resin type. The low fuming and high fuming resin type has mole ratio of formaldehyde: urea, 1.1:1 and 1.5:1 respectively.

The test results are summarized in Table XIX, XX, and XXI:

TABLE XIX

Results of the measurements of formaldehyde released by the two hour dessicator method for a high and low mole ratio resin, two formaldehyde scavengers at three levels compared to controls for three layer particleboard pressed at two press times.

| Board No. | Resin mole Ratio | Scavenger Identification | Level (%) | Press Time (mins.) | Formaldehyde Determination Average (μg/ml) |
|---|---|---|---|---|---|
| 73,75,77 | 1.1:1 | Control | 0 | 3.5 | 0.762 |
| 79,81,83 | 1.1:1 | Control | 0 | 4.5 | 0.873 |
| 1,13,25 | 1.1:1 | FSD* | 0.5 | 3.5 | 0.531 |
| 37,49,61 | 1.1:1 | FSD | 0.5 | 4.5 | 0.547 |
| 5,17,29 | 1.1:1 | FSD | 1.0 | 3.5 | 0.602 |
| 41,53,65 | 1.1:1 | FSD | 1.0 | 4.5 | 0.513 |
| 9,21,33 | 1.1:1 | FSD | 1.0 | 3.5 | 0.674 |
| 45,57,69 | 1.1:1 | FSD | 1.5 | 4.5 | 0.602 |
| 3,15,27 | 1.1:1 | FSD-2+ | 0.5 | 3.5 | 0.426 |
| 39,51,63 | 1.1:1 | FSD-2 | 0.5 | 4.5 | 0.489 |
| 7,19,31 | 1.1:1 | FSD-2 | 1.0 | 3.5 | 0.582 |
| 43,55,67 | 1.1:1 | FSD-2 | 1.0 | 4.5 | 0.522 |
| 11,23,35 | 1.1:1 | FSD-2 | 1.5 | 3.5 | 0.604 |
| 47,59,71 | 1.1:1 | FSD-2 | 1.5 | 4.5 | 0.510 |
| 74,76,78 | 1.5:1 | Control | 0 | 3.5 | 4.246 |
| 80,82,84 | 1.5:1 | Control | 0 | 4.5 | 4.118 |
| 2,14,26 | 1.5:1 | FSD | 0.5 | 3.5 | 3.621 |
| 38,50,62 | 1.5:1 | FSD | 0.5 | 4.5 | 4.486 |
| 6,18,30 | 1.5:1 | FSD | 1.0 | 3.5 | 3.828 |
| 42,54,66 | 1.5:1 | FSD | 1.0 | 4.5 | 4.102 |
| 10,22,34 | 1.5:1 | FSD | 1.5 | 3.5 | 3.444 |
| 46,58,70 | 1.5:1 | FSD | 1.5 | 4.5 | 3.719 |
| 4,16,28 | 1.5:1 | FSD-2 | 0.5 | 3.5 | 4.541 |
| 40,52,64 | 1.5:1 | FSD-2 | 0.5 | 4.5 | 4.352 |
| 8,20,32 | 1.5:1 | FSD-2 | 1.0 | 3.5 | 3.682 |
| 44,56,68 | 1.5:1 | FSD-2 | 1.0 | 4.5 | 3.438 |
| 12,24,36 | 1.5:1 | FSD-2 | 1.5 | 3.5 | 3.603 |
| 48,60,72 | 1.5:1 | FSD-2 | 1.5 | 4.5 | 4.292 |

*FSD = bis (2-hydroxyethoxyethyl) malonate
+ FSD-2 = (2-hydroxyethoxyethyl) acetoacetate

TABLE XX

Duncan groupings for the results of the measurement of formaldehyde released by the two hour dessicator method for a high and a low mole ratio resin for two formaldehyde scavengers at three levels compared to controls for three-layer particleboards pressed at two press times.**

| Identification | Mean | Duncan Grouping |
|---|---|---|
| | 1.1:1 Resin | A |
| Scavenger | | |
| None | 0.817 | A |
| FSD | 0.578 | B |
| FSD-2 | 0.522 | B |
| Scavenger Level | | |
| 0 Percent | 0.817 | A |
| 0.5 Percent | 0.498 | B |
| 1.0 Percent | 0.555 | B |
| 1.5 Percent | 0.597 | B |
| Press Times | | |
| 3.5 Minutes | 0.597 | A |
| 4.5 Minutes | 0.579 | A |
| | 1.5:1 Resin | B |
| Scavenger | | |
| None | 4.182 | A |
| FSD | 3.867 | A |
| FSD-2 | 3.985 | A |
| Scavenger Level | | |
| 0 Percent | 4.182 | A |
| 0.5 Percent | 4.250 | A |
| 1.0 Percent | 3.763 | A |
| 1.5 Percent | 3.764 | A |
| Press Times | | |
| 3.5 Minutes | 3.852 | A |
| 4.5 Minutes | 4.073 | A |

**Means with the same letter are act significantly different.

In Table XX, the Duncan Test (Duncan, David B., *Multiple Range and Multiple F Tests*, Biometric, March, New Haven, Conn. pp. 1–42 (1955); Steel, Robert G. D. and James H. Tornie, *Principles and Procedures of Statistics*, Second Edition, McGraw-Hill Book Company, Inc., New York, N.Y. pp. 187–188 (1980)) is used to determine whether there is statistical difference between the formaldehyde measurements for the high and low mole ratio resin for two formaldehyde scavengers at three levels compared to controls for three-layer particle boards pressed at two press times.

The Duncan test compares each treatment mean with every other treatment mean and determines which differences are significant. The idea of significance level is replaced by that of special protection levels against finding false significant differences. These levels are based on treatment on degrees of freedom; the probability of finding a statistically significant difference between any two means, when the corresponding true means are equal, is less than or equal to the significance level stated in the table developed for this test entitled "Significant Studentized Ranges for 5% and 1% Level New Multiple-Range Test."

In the reporting of data, letters are used to identify the means being compared. Those with the same letter identification, say A, are not statistically different at the 5% level, while those identified by different letters, say B, are statistically different at the 5% level.

The test results in Table XX, shows that the mole ratio of formaldehyde: urea used in the resin, and the levels of formaldehyde scavenger used in the range from 0–1.5 percent are statistically significant parameters in determining the amount of formaldehyde released. On the other hand, the use of press times in the range from 3.5–4.5 minutes is shown to have no statistical effect on the amount of formaldehyde released.

Table XXI summarizes the percent reduction at the optimum application levels.

TABLE XXI

| Low Fuming Resin | | | High Fuming Resin | | |
|---|---|---|---|---|---|
| | % Reduction | | | % Reduction | |
| Cure Time | FSD | FSD-2 | Cure Time | FSD | FSD-2 |
| 3.5 min | 30.3 | 44.1 | 3.5 min | 18.9 | 15.1 |
| 4.5 min | 37.3 | 44.9 | 4.5 min | 12.4 | None |
| Control (μg/ml) | .762 | .873 | Control (μg/ml) | 4.246 | 4.118 |

The high fuming resins are a type that are generally not used in the wood products industry because of the high level of odor formaldehyde (4.1–4.2 μg/ml). The data shows very little reduction for these resins with FSD and FSD-2. The data shows the low fuming resins give the best results with over 44% reduction in formaldehyde at 0.5 percent level owb using the two hour dessicator method as shown in Table XXI.

The foregoing examples are intended to illustrate, without limitation, the compositions of water-soluble formaldehyde scavengers of the present invention, their preparation, and use thereof in reducing the amount of formaldehyde released from fabrics and from particleboard without detracting from the properties of the fabrics or the particleboard. It is understood that changes and variations can be made therein without departing from the scope of the invention as defined in the following claims.

What is claimed is:

1. A composition for a formaldehyde scavenger consisting of a water-soluble active methylene compound of the formula:

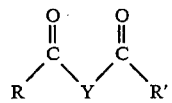

Wherein R and R' are $CH_3$, or

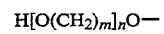

$H[O(CH_2)_m]_nO-$ and wherein m and n are selected from the group of combinations of m and n consisting of: m=1 and n=1, 3–19; m=2 and n=2–19; or m=3 and n=1–19, Y is $-CH_2-$ or $-CH_2-CO-CH_2-$.

2. A composition for a formaldehyde scavenger according to claim 1 wherein Y is $-CH_2-$.

3. A composition for a formaldehyde scavenger according to claim 1 wherein Y is $-CH_2-CO-CH_2-$.

4. A composition for a formaldehyde scavenger according to claim 1 wherein the water soluble active methylene compound is (2-hydroxyethoxyethyl) acetoacetate.

5. A composition for a formaldehyde scavenger according to claim 1 wherein said water soluble active methylene compound is (2-hydroxyethoxyethyl) malonate.

6. A composition for a formaldehyde scavenger according to claim 1 wherein n is an integer from 3 to 19.

7. A composition for a formaldehyde scavenger according to claim 1 wherein m is 3.

8. A composition for a formaldehyde scavenger according to claim 1 wherein m is 1.

9. A composition for a formaldehyde scavenger according to claim 1 wherein n is 1.

* * * * *